United States Patent
Helot et al.

(10) Patent No.: US 6,522,535 B1
(45) Date of Patent: Feb. 18, 2003

(54) METHOD AND APPARATUS FOR COOLING A PORTABLE COMPUTER IN A DOCKING STATION

(75) Inventors: Jacques H Helot, Corvallis, OR (US); Michael D Derocher, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 738 days.

(21) Appl. No.: 08/956,974

(22) Filed: Oct. 23, 1997

(51) Int. Cl.[7] .................................................. G06F 1/20
(52) U.S. Cl. ....................... 361/687; 361/686; 454/184; 165/104.34
(58) Field of Search ................................ 361/683, 687, 361/686, 690, 694, 695; 454/184; 165/104.34; 364/708.1

(56) References Cited

U.S. PATENT DOCUMENTS

| | | | | |
|---|---|---|---|---|
| 5,283,714 A | | 2/1994 | Tsai et al. | 361/683 |
| 5,694,292 A | * | 12/1997 | Paulsel et al. | 361/687 |
| 5,704,212 A | * | 1/1998 | Erler et al. | 361/687 |
| 5,713,790 A | * | 2/1998 | Lin | 454/184 |
| 5,757,615 A | * | 5/1998 | Donahoe et al. | 361/687 |
| 5,768,101 A | * | 6/1998 | Cheng | 361/687 |
| 5,784,253 A | * | 7/1998 | Ooka et al. | 361/687 |

* cited by examiner

Primary Examiner—Darren Schuberg
Assistant Examiner—Lisa Lea-Edmonds

(57) ABSTRACT

A docking station for a portable computer has a fan and an airflow coupler for adjoining the docking station and an airflow port on the portable computer. The portable computer is adjoined to the docking station in a way that enables air to flow between the portable computer and the docking station, thereby reducing internal heating of the portable computer when docked.

16 Claims, 4 Drawing Sheets

METHOD AND APPARATUS FOR COOLING A PORTABLE COMPUTER IN A DOCKING STATION

BACKGROUND OF THE INVENTION

The present invention concerns docking stations for portable computers and more specifically a cooling system in the docking station for the portable computer while docked.

Generally a portable computer, such as a notebook computer, a laptop computer or a palm top computer, is optimized to reduce size and weight. This often requires tradeoffs, for example, in the size of the display and keyboard, as well as the number and types of ports which are implemented.

One way to increase the versatility of portable computers is to provide for a docking station. The docking station when connected to a portable computer provides for a number of different types of ports. These ports are used, for example, to drive a large monitor, communicate with various peripherals, provide connection to a network, and so on. See, for example, U.S. Pat. No. 5,283,714 issued to Collins Tsai, et al, for "Docking Apparatus for a Portable Computer."

The docking station may reside in a permanent location with ports connected to various devices. When "at the office" a user can take advantage of the power of a full desktop computer by connecting the portable computer to the docking station. When "on the road" the user has the advantage of a light weight and small sized personal computer.

Portable computers, with the increasing processing speed and capability, have incurred some new problems. As the processors get larger, so does the power required to run them. With this additional power comes additional latent heat that must be removed or cooled in the personal computer. A few of the latest portable computers have fans to either draw the heat out of the computer or force cool air into the computer in an effort to minimize the temperature interior to the computer shell. Since the portable computer typically consumes more power when "at the office" due to additional power consuming functions it performs when docked, such as networking, driving an external monitor due to increased resolution and screen savers, etc., the heat problem is more prevalent when the portable computer is docked. Additionally, when portable computers are docked with the lid closed, the heat that typically radiates from the keyboard is trapped.

When a portable computer overheats, it typically will attempt to conserve power by reducing the power to the processor, which in turn slows the processor speed. With sufficient overheating, the processor will shut down completely. Other components may simply fail if the portable computer overheats. All of these scenarios are huge inconveniences to the user.

While a fan is useful in preventing a portable computer from overheating, it adds to the size and weight of the portable computer. This is undesirable, as mobile computing users want their portable computers to be small and lightweight when they are "on the road".

SUMMARY OF THE INVENTION

A docking station for a portable computer has a fan and an airflow coupler for adjoining the docking station and an airflow port on the portable computer. The portable computer is adjoined to the docking station in a way that enables air to flow between the portable computer and the docking station, thereby reducing internal heating of the portable computer when docked.

DETAILED DESCRIPTION OF THE PREFERRED AND ALTERNATE EMBODIMENTS

Figure 1:
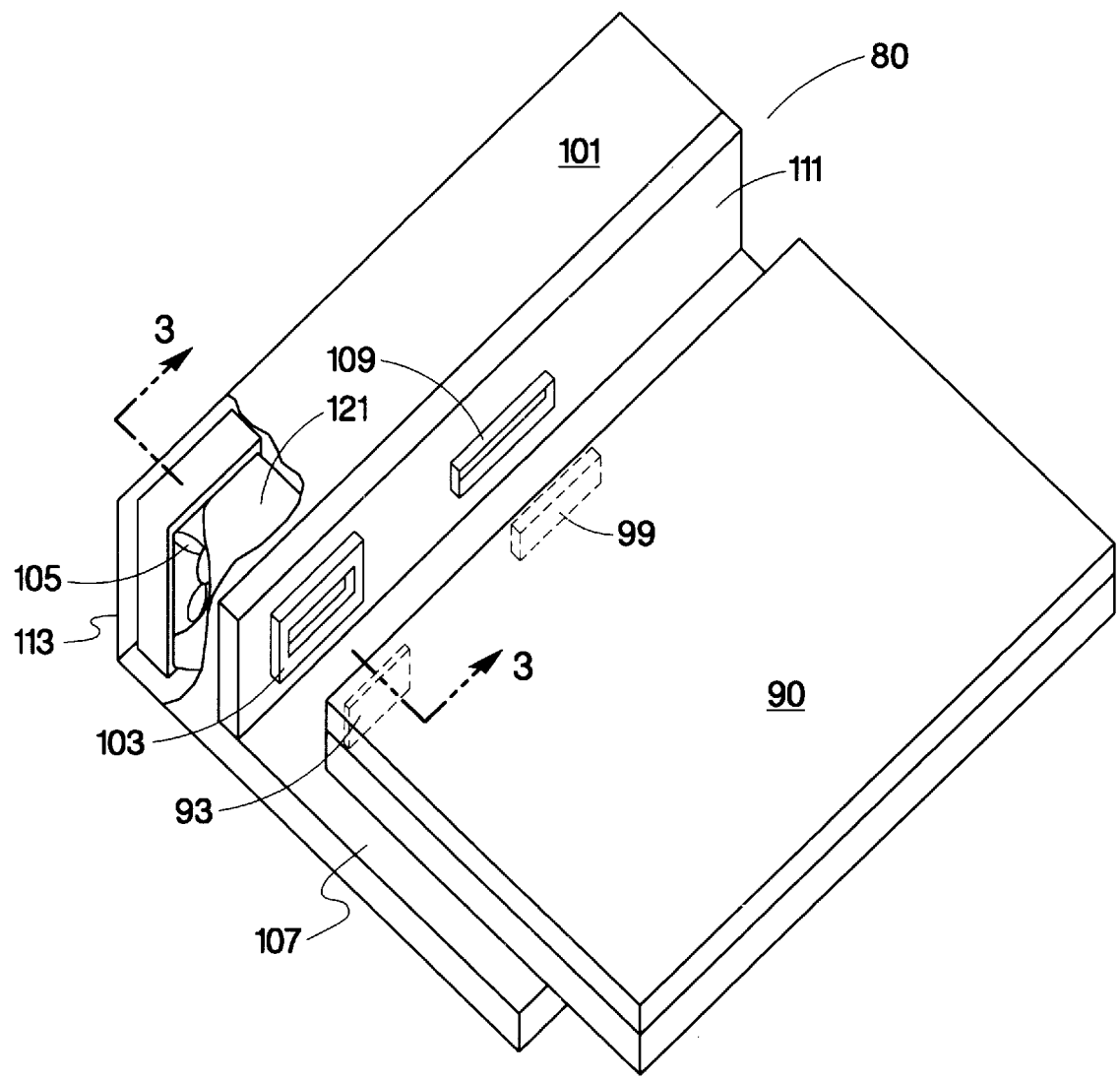
FIG. 1 is a computer system of the preferred embodiment of the invention.

FIG. 1 shows computer system 80, which includes docking station 101 and portable computer 90. Docking station 101 has a base 107 for portable computer 90 to sit on while docked in docking station 101. Portable computer interface 109, located on the front surface 111 of docking station 101 connects with docking station interface 99 in portable computer 90. Also on this same front surface 111, airflow coupler 103 adjoins with airflow port 93 in portable computer 90. Airflow coupler 103 allows air from airflow port 93 of portable computer 90 to freely flow into the cooling system of docking station 101 as opposed to stopping stagnantly in the small space between portable computer 90 and docking station 101. In the preferred embodiment, airflow coupler 103 is made of a compressible rubber material and is in a rectangular shape. Those skilled in the art can appreciate that many alternate materials and shapes could be used for airflow coupler 103. The flow of air that leaves portable computer 90 and enters docking station 101 is quickly removed with the assistance of fan 105. Fan 105 is preferably attached to an opening in back surface 113 of docking station 101. An embodiment has been contemplated where docking station 101 performs a similar cooling function to that described above by forcing air into docking station 101 with the assistance of fan 105, through airflow coupler 103 and airflow port 93, then into portable computer 90. If portable computer 90 also contains a fan, this fan can assist fan 105 in docking station 101 to cool portable computer 90.

Figure 2:
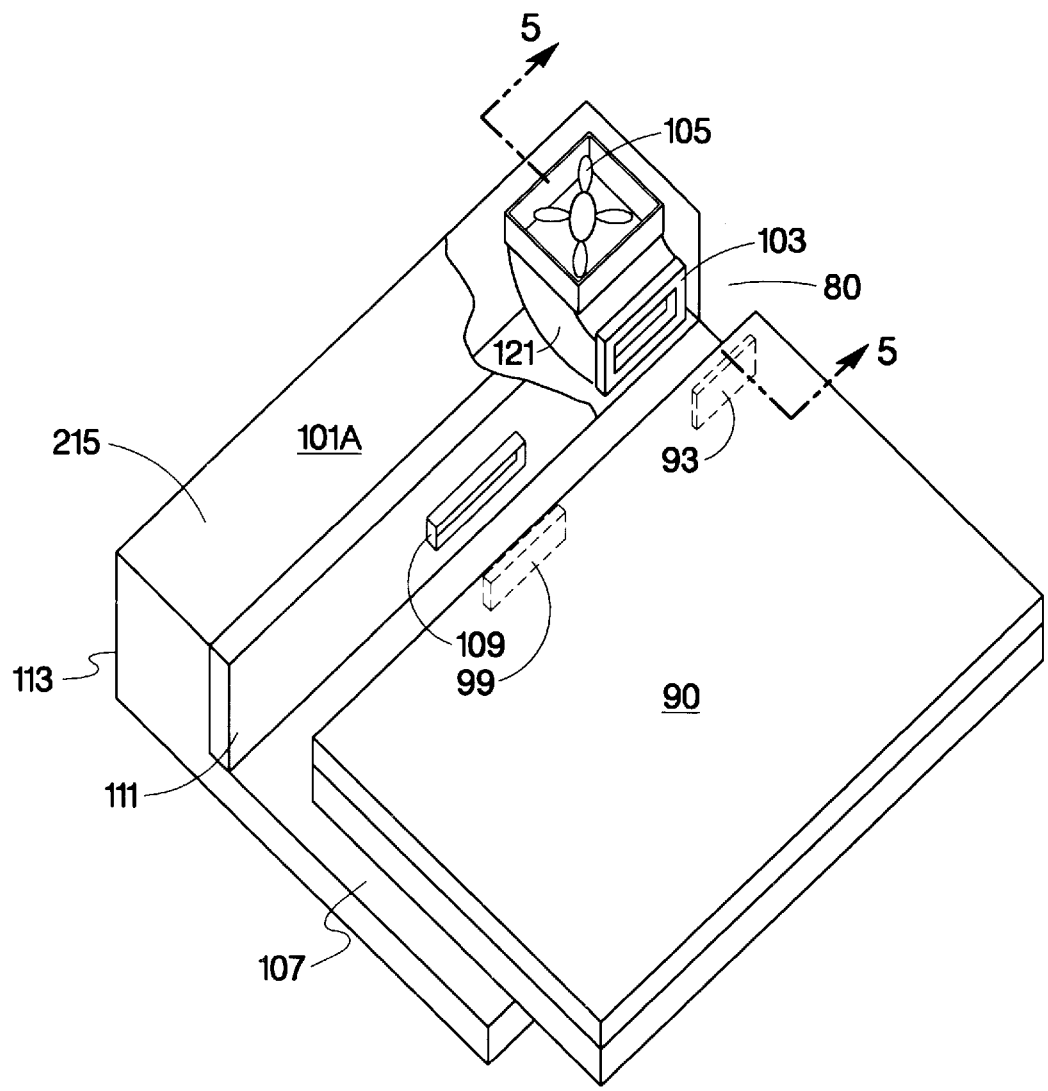
FIG. 2 is a computer system of an alternate embodiment of the invention.

FIG. 2 illustrates an alternate embodiment for computer system 80 which has fan 105 attached to top surface 215 of docking station 101a through the same airflow coupler 103 attached to front surface 111 and airflow port 93 on portable computer 90 as described previously in the preferred embodiment of FIG. 1. As those skilled in the art would appreciate, often there are many connections that extend out back surface 113 of a portable computer docking station. The embodiment depicted in FIG. 2 would give an alternative position for fan 105 in the event it was desirable to have a top mounted fan in the docking station. Other alternate embodiments have been contemplated with fan 105 mounted elsewhere on docking station 101, such as on either side or the bottom of docking station 101.

Figure 3:
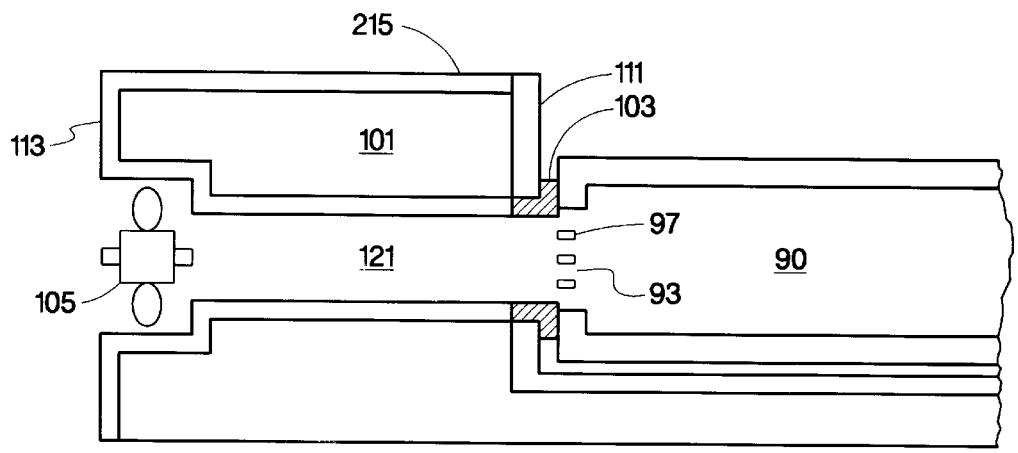
FIG. 3 is cross-sectional view A—A of the computer system of the preferred embodiment shown in FIG. 1.

FIG. 3 shows a cross-section view A—A of the preferred embodiment shown in computer system 80 of FIG. 1. Airflow duct 121 spans between fan 105 and airflow coupler 103 of docking station 101. Airflow duct 121 will not only channel the air being drawn out of portable computer 90, but also avoids additional heat and particles from entering the main housing of docking station 101. Portable computer 90 shown in this preferred embodiment depicts louvers 97 in airflow port 93 of portable computer 90. While fan 105 preferably functions to pull heated air out of portable computer 90, an embodiment has been contemplated where fan 105 forces cool air into portable computer 90.

Figure 4:
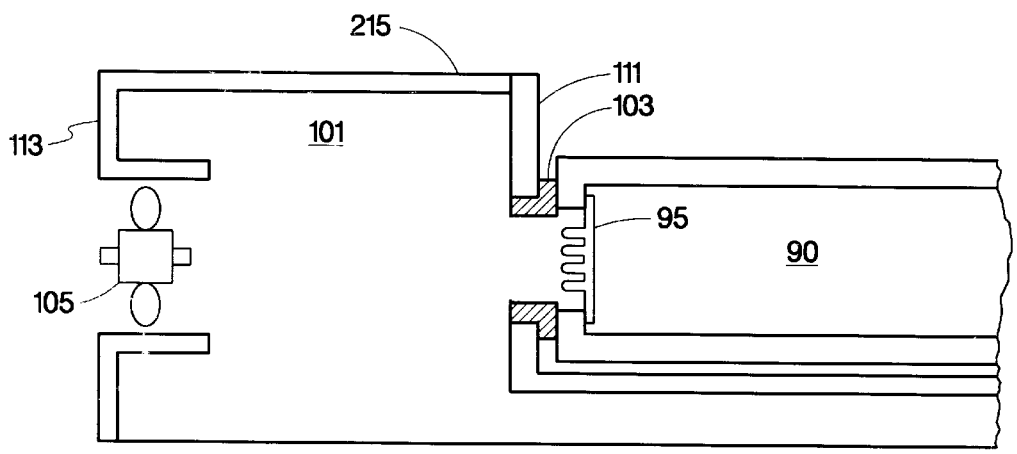
FIG. 4 is a view of a computer system of another alternate embodiment of the invention.

FIG. 4 is a view of a computer system of another alternate embodiment of the invention. The embodiment shown in FIG. 4 is similar to the preferred embodiment of FIG. 3, except that duct 121 is not present. In addition, metal plate 95, used as a heat sink for heat producing component(s) in portable computer 90, is shown attached to airflow port 93 on portable computer 90, although louvers 97 could alternatively be used in this embodiment.

Figure 5:
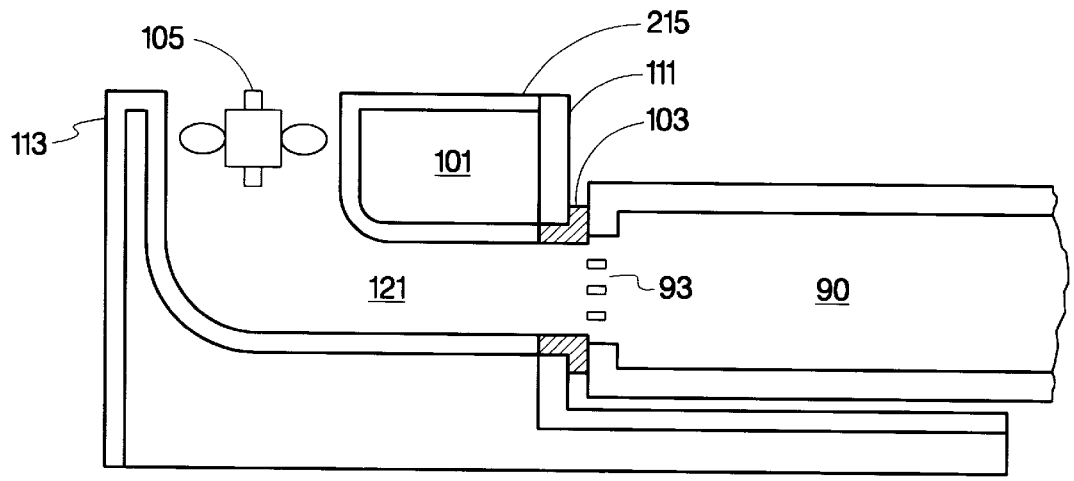
FIG. 5 is cross-sectional view B—B of the computer system of the alternate embodiment shown in FIG. 2.

FIG. 5 shows cross-sectional view B—B of portable computer 90 of the alternate embodiment of FIG. 2. Here fan 105 is again mounted to top surface 115 of docking station 101. Airflow duct 121 dictates the path of the air stream between docking station 101 and portable computer 90. As in the preferred embodiment of FIG. 3, the shape of the airflow duct 121 is preferred to be rectangular. However, the shape may be any other shape such as polygon or round, and those skilled in the art would find this shape largely determined by the shape of airflow port 93 in portable computer 90.

Figure 6:
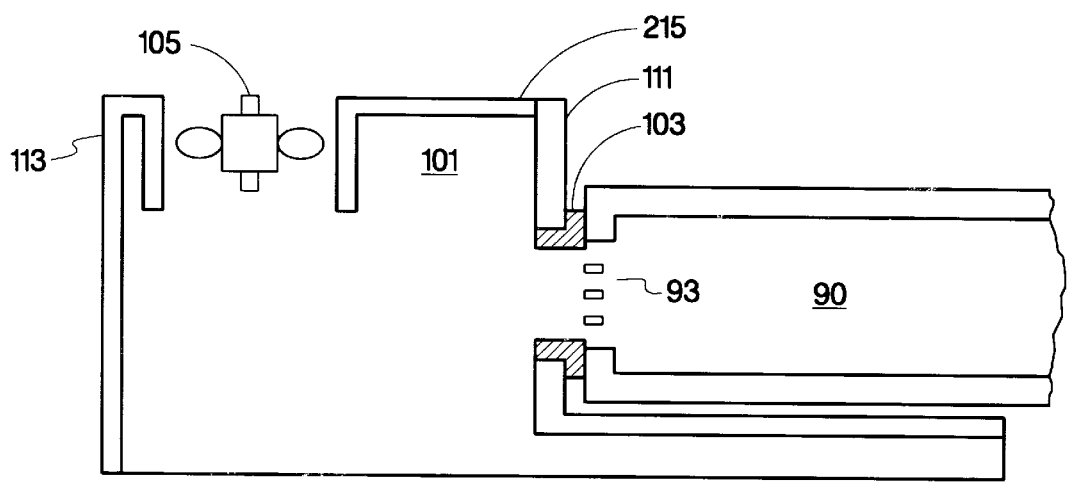
FIG. 6 is a view of a computer system of another alternate embodiment of the invention.

FIG. 6 is a view of a computer system of another alternate embodiment of the invention. The embodiment shown in FIG. 6 is similar to the embodiment of FIG. 5 except that airflow duct 121 is not present.

Both the preferred embodiment shown in FIG. 1 and cross-sectioned in FIG. 3, and an alternative embodiment shown in FIG. 2 and cross-sectioned in FIG. 5 as well as the other embodiments shown and described would be very effective in reducing the trapped heat experienced in the more powerful docking portable computers on the market today and in the future.

What is claimed is:

1. A docking station for a portable computer, comprising:
    an airflow coupler for adjoining said docking station to an airflow port of said portable computer, wherein said airflow port allows air to flow between said docking station and said portable computer through said airflow port; and
    a fan.

2. The docking station of claim 1, further comprising an airflow duct extending from said airflow coupler to said fan.

3. The docking station of claim 2, wherein said airflow coupler is compressible.

4. The docking station of claim 3, wherein said airflow duct spans a front surface to a back surface of said docking station.

5. The docking station of claim 3, wherein said airflow duct spans a front surface to a top surface of said docking station.

6. The docking station of claim 4, wherein said fan is disposed in said airflow duct and affixed to said back surface of said docking station.

7. The docking station of claim 5, wherein said fan is disposed in said airflow duct and affixed to said top surface of said docking station.

8. The docking station of claim 6, wherein said fan rotates in a direction that forces air into said portable computer.

9. The docking station of claim 7, wherein said fan rotates in a direction that forces air into said portable computer.

10. The docking station of claim 6, wherein said fan rotates in a direction that draws air out of said portable computer.

11. The docking station of claim 7, wherein said fan rotates in a direction that draws air out of said portable computer.

12. A computer system, comprising:
    a portable computer, further comprising an air flow port; and
    a docking station, further comprising:
        an airflow coupler for adjoining said docking station to said airflow port of said portable computer, wherein said airflow port allows air to flow between said docking station and said portable computer through said airflow port; and
        a fan.

13. The computer system of claim 12, wherein said airflow port on said portable computer further comprises a louvered opening to an exterior surface of said portable computer.

14. A method for cooling a portable computer having an airflow port, comprising the steps of:
    connecting said airflow port on said portable computer to an airflow coupler on said docking station, said docking station also having a fan;
    forcibly moving air through an interior cavity of said portable computer; and
    moving said air through said docking station with said fan.

15. The method for cooling a portable computer of claim 14, wherein said step of forcibly moving air draws said air out of said portable computer into said docking station.

16. The method for cooling a portable computer of claim 14, wherein said step of forcibly moving air forces said air out of said docking station and into said portable computer.

* * * * *